G. E. METCALF.
ROTARY FILE.
APPLICATION FILED AUG. 8, 1904.
992,437.
Patented May 16, 1911.
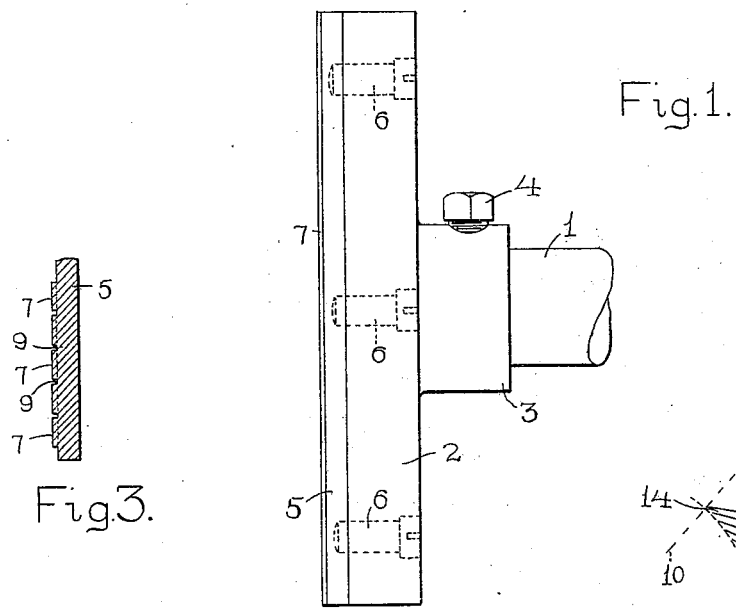
Fig. 1.
Fig. 3.
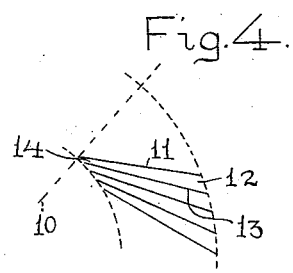
Fig. 4.
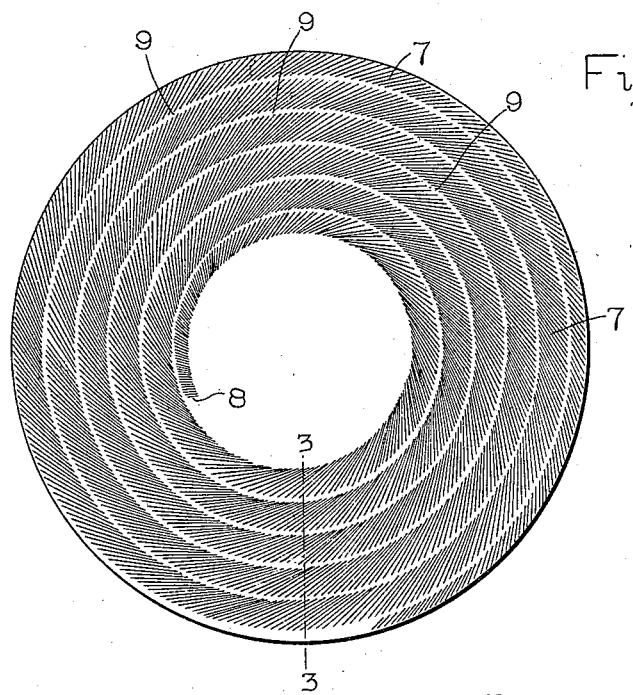
Fig. 2.
Witnesses
Roy D. Tolman.
Penelope Cumberbach.
Inventor
George E. Metcalf.
By Rufus B. Fowler
Attorney

UNITED STATES PATENT OFFICE.

GEORGE E. METCALF, OF WORCESTER, MASSACHUSETTS.

ROTARY FILE.

992,437.

Specification of Letters Patent.

Patented May 16, 1911.

Application filed August 8, 1904. Serial No. 219,854.

*To all whom it may concern:*

Be it known that I, GEORGE E. METCALF, a citizen of the United States, residing at Worcester, in the county of Worcester and Commonwealth of Massachusetts, have invented a new and useful Improvement in Rotary Files, of which the following is a specification, accompanied by drawings forming a part of the same, in which—

Figure 1 represents a side view of a rotary file embodying my invention. Fig. 2 is a front or face view of the same. Fig. 3 is a sectional view of a portion of the plate 5 on the line 3—3, Fig. 2, and Fig. 4 is a diagrammatic view showing on a larger scale the arrangement of the file teeth on the surface of the plate 5.

Similar reference letters and figures refer to similar parts in the different views.

My improved rotary file consists of a circular disk capable of being attached to a rotating shaft and preferably provided on one of its sides with a steel disk or plate having a row of file teeth extending in a spiral line from a point near the center of the disk to its outer periphery, and having a spiral blank space between the file teeth and corresponding to the spiral line of teeth.

Referring to the accompanying drawings 1 denotes a shaft and 2 a disk provided with a hub 3 and attached to the shaft by a set screw 4. Attached to the side of the disk 2 and opposite the hub 3 is a hardened steel plate 5 securely held upon the disk 2 by attaching screws 6. Upon the side of the steel plate 5 is cut a series of file teeth 7 beginning at a point 8 near the center of the plate and extending in a spiral row to the edge or periphery of the plate. Each of the file teeth in the operation of cutting is slightly raised above the surface of the plate and between each of the rows of file teeth is left a narrow blank space 9. Each of the file teeth are cut at a uniform acute angle to a radial line passing through the inner end of the tooth, as shown in diagrammatic view in Fig. 4 in which 10 denotes a radial line and 11 one of the file teeth forming an acute angle at its inner end with the radial line 10. This arrangement of the file teeth on the surface of the plate 5 causes the teeth to diverge at their outer ends and making the space 12 between the outer ends of adjacent teeth 11 and 13 greater than the space 14 at the inner ends of the teeth, as shown in diagrammatic view in Fig. 4. Any piece of work, therefore, held against the file surface of the plate 5 in a radial position to the plate will be engaged successively by the file teeth at an acute angle producing what is known as a shearing cut, and the file chips detached from the work will be crowded between the adjacent teeth by an outward movement and be delivered from between the teeth at their outer ends or to the wider space 12 into one of the spiral clear spaces 9, thereby preventing the clogging of the teeth.

The clear space 9 forms a single continuous spiral furrow or depression beginning near the center of the steel plate and terminating at its periphery, and inclosed between the convolutions of said furrow is a continuous spiral strip on which the teeth 7 are cut, producing a narrow continuous cutting surface in spiral form. This arrangement of teeth possesses several advantages. It facilitates the true and accurate cutting of the teeth, which can be cut continuously from one end of the spiral space to the other, and further greatly increases the efficiency of the cutting surface, as it provides a series of short teeth which readily clear themselves into the furrow 9 at the outer ends of the teeth, and as the teeth are brought into contact with the surface to be cut each succeeding tooth overlaps throughout the greater part of its length the next preceding tooth, causing the work to be smoothly cut. Separate portions of the spiral space can be recut without interfering with the quality of the work.

What I claim as my invention and desire to secure by Letters Patent is:—

1. A rotatable file, comprising a disk provided with a single continuous row of transverse file teeth lying in the same plane, said row arranged spirally upon said disk, with each approximately circular convolution of said spiral row approximately concentric with the axis of rotation of said disk, and with each tooth in said row arranged at an acute angle to a radial line on the face of said disk passing through the end of said tooth.

2. A rotatable file, comprising a disk provided with a single continuous row of transverse file teeth lying in the same plane, said row arranged spirally upon said disk, with a continuous blank space also arranged spirally between the convolutions of said row, with each of said teeth in said row arranged at a uniform acute angle to a radial line passing through the end of said tooth.

GEORGE E. METCALF.

Witnesses:
RUFUS B. FOWLER,
PENELOPE COMBERBACH.

---

Copies of this patent may be obtained for five cents each, by addressing the "Commissioner of Patents, Washington, D. C."